US012753646B2

(12) United States Patent
Rebarchak

(10) Patent No.: US 12,753,646 B2
(45) Date of Patent: Oct. 6, 2026

(54) VIBRATION ISOLATOR FOR OVERHEAD DOORS

(71) Applicant: CornellCookson, LLC, Mountain Top, PA (US)

(72) Inventor: Christopher John Rebarchak, White Haven, PA (US)

( * ) Notice: Subject to any disclaimer, the term of this patent is extended or adjusted under 35 U.S.C. 154(b) by 0 days.

(21) Appl. No.: 17/892,724

(22) Filed: Aug. 22, 2022

(65) Prior Publication Data

US 2023/0235605 A1 Jul. 27, 2023

Related U.S. Application Data

(63) Continuation-in-part of application No. 17/582,564, filed on Jan. 24, 2022, now abandoned.

(51) Int. Cl.

*E06B 9/58* (2006.01)
*E05D 15/16* (2006.01)

(52) U.S. Cl.

CPC .............. *E05D 15/165* (2013.01); *E06B 9/58* (2013.01); *E05Y 2800/422* (2013.01); *E06B 2009/587* (2013.01)

(58) Field of Classification Search

CPC .......... E05D 15/165; E05D 15/16–248; E05D 2015/225; E05D 15/401; E05D 15/425; E05D 15/445; E05D 15/463; E06B 3/44; E06B 3/485; E06B 9/582; E06B 9/58; E06B 2009/588; E06B 1/522; E05Y 2900/106; E05Y 2800/422

See application file for complete search history.

(56) References Cited

U.S. PATENT DOCUMENTS 4,467,853 A * 8/1984 Downey, Jr. ............ E06B 9/581 160/133
4,987,638 A * 1/1991 Ribaudo ............... E05D 15/063 104/93
4,993,188 A * 2/1991 Erickson ................... E06B 3/44 49/419
5,119,592 A * 6/1992 Westfall .............. E05D 13/1207 49/419
5,203,392 A 4/1993 Shea
5,546,702 A * 8/1996 deNormand ............ E05D 15/22 49/419

(Continued)

FOREIGN PATENT DOCUMENTS

AU 2019250240 A1 * 5/2020 ............. E06B 9/581
DE 102011117857 A1 * 5/2013 ............ E05F 15/622

(Continued)

OTHER PUBLICATIONS

International Search Report mailed in counterpart PCT Application No. PCT/US2023/60749 on Apr. 25, 2023, 8 pages.

*Primary Examiner* — Daniel P Cahn
*Assistant Examiner* — Patrick B. Ponciano

(57) ABSTRACT

In an example an overhead door track is provided. The overhead door track includes a vertical track section having an opening to receive a roller of a panel of an overhead door and to guide movement of the roller within the opening and a single solid polymer based vibration isolator coupled to the vertical track section to reduce vibration of the vertical track section caused by movement of the roller within the opening.

11 Claims, 7 Drawing Sheets

(56) References Cited

U.S. PATENT DOCUMENTS 5,657,805 A * 8/1997 Magro .................... E06B 9/581 160/133
5,887,385 A 3/1999 Horner et al.
6,698,490 B2 * 3/2004 Hoerner .................. E06B 9/581 49/197
6,729,380 B2 * 5/2004 Whitley .................. E05D 15/24 16/DIG. 6
7,389,807 B2 6/2008 Nagare et al.
8,240,087 B2 * 8/2012 Kinross ..................... E05D 7/10 49/413
9,032,668 B2 * 5/2015 Blackwood .............. B60J 10/84 49/489.1
9,181,748 B2 11/2015 Sofianek et al.
11,725,442 B1 * 8/2023 Miller ..................... E05D 15/30 16/2.5
2004/0020613 A1 * 2/2004 Koike ................. E05D 15/0652 160/196.1
2005/0076591 A1 4/2005 Koeller
2009/0078377 A1 * 3/2009 Ohara ..................... E06B 9/582 160/127
2016/0348424 A1 12/2016 Lorenzani et al.
2017/0067285 A1 * 3/2017 Lambridis ............... E06B 9/581
2017/0292571 A1 * 10/2017 Park ....................... B60G 7/005
2019/0345986 A1 * 11/2019 Isobe ........................ F16D 3/79
2023/0235616 A1 * 7/2023 Rebarchak .............. E05D 15/22 49/197

FOREIGN PATENT DOCUMENTS

EP 1571281 A2 * 9/2005 ............. E06B 1/522
EP 2136025 A2 * 12/2009 ............. E06B 1/522
FR 3093342 A1 * 9/2020 ............. E06B 9/582
KR 20180138342 A * 6/2017
WO WO-2020104344 A1 * 5/2020 ............. E06B 1/522

* cited by examiner

VIBRATION ISOLATOR FOR OVERHEAD DOORS

CROSS-REFERENCE TO RELATED APPLICATIONS

This application is a continuation-in-part of U.S. patent application Ser. No. 17/582,564 filed on Jan. 24, 2022, which is hereby incorporated by reference in its entirety.

BACKGROUND

Overhead doors can be used to control access into buildings. Typically, such an overhead door has a number of rectangular door panels or panel sections, the total area of which is similar or equal to the area of the aperture that needs to be closed, and the width of which is close to the width of the wall opening that needs to be closed.

In some embodiments, the panel sections are joined to each other at their longitudinal edges with hinges or endlocks. In other embodiments, the panels can be unconnected from each other and moved as separated panels. The overhead door moves on two lateral tracks by means of rollers or endlocks guided within the two lateral tracks.

The tracks have three sections: vertical, transitional, and horizontal sections. When the overhead door is vertical in a closed position, the wall opening is covered by the overhead sectional door. When the overhead door is opening, the panels move up, pass the transitional track section, and move into the horizontal track section of the track to rest in a horizontal position or "open" position. When the overhead door is in the horizontal position, the door is situated superjacent to the wall opening.

BRIEF DESCRIPTION OF THE DRAWINGS

The teaching of the present disclosure can be readily understood by considering the following detailed description in conjunction with the accompanying drawings, in which.

To facilitate understanding, identical reference numerals have been used, where possible, to designate identical elements that are common to the figures.

DETAILED DESCRIPTION

The present disclosure relates to a vibration isolator for overhead doors. As discussed above, an overhead door has a number of rectangular door panels or panel sections. The overhead door moves on two lateral tracks by means of rollers. The tracks can have one or more sections, including: a vertical section, a transitional section, and/or a horizontal section.

Movement of the panels within the tracks can cause vibrations. The vibrations can create relatively loud operation of the overhead door when the door is opened and closed. The vibrations can also cause the tracks or guides to slightly move over time. The movement can cause functional issues with the door over time. For example, the rollers of the panels, or ends of the slats, can be slightly misaligned with the guides that have moved. This can lead to even larger vibrations causing further movement and/or louder operational noise, or can cause the overhead door to become stuck during operation.

The present disclosure provides a vibration isolator or dampener for overhead doors. The vibration isolator may be formed from a single solid piece of a polymer. The vibration isolator may be based on a family of nitrile rubber. The vibration isolator may help to reduce vibrations caused by operation of the overhead door, provide long term stability and prevent shifting of the guides after multiple cycles of opening and closing the overhead door, and maintain R-values or U-factors for the overhead door.

An example overhead door may be a rolling or coiling door that is utilized in a residential, commercial, institutional, or other structure to selectively cover an opening in a wall of the structure. Vertical tracks receive ends of the rolling door and guide movement of the rolling door.

In one embodiment, an overhead door includes a number of elongate and generally horizontally oriented door panels. The overhead door and the panels are movable selectively to and between a closed position in which the door covers an opening in a doorway structure and an open position which exposes the opening in the doorway structure and positions the panels outside the opening in the doorway structure.

Figure 9:
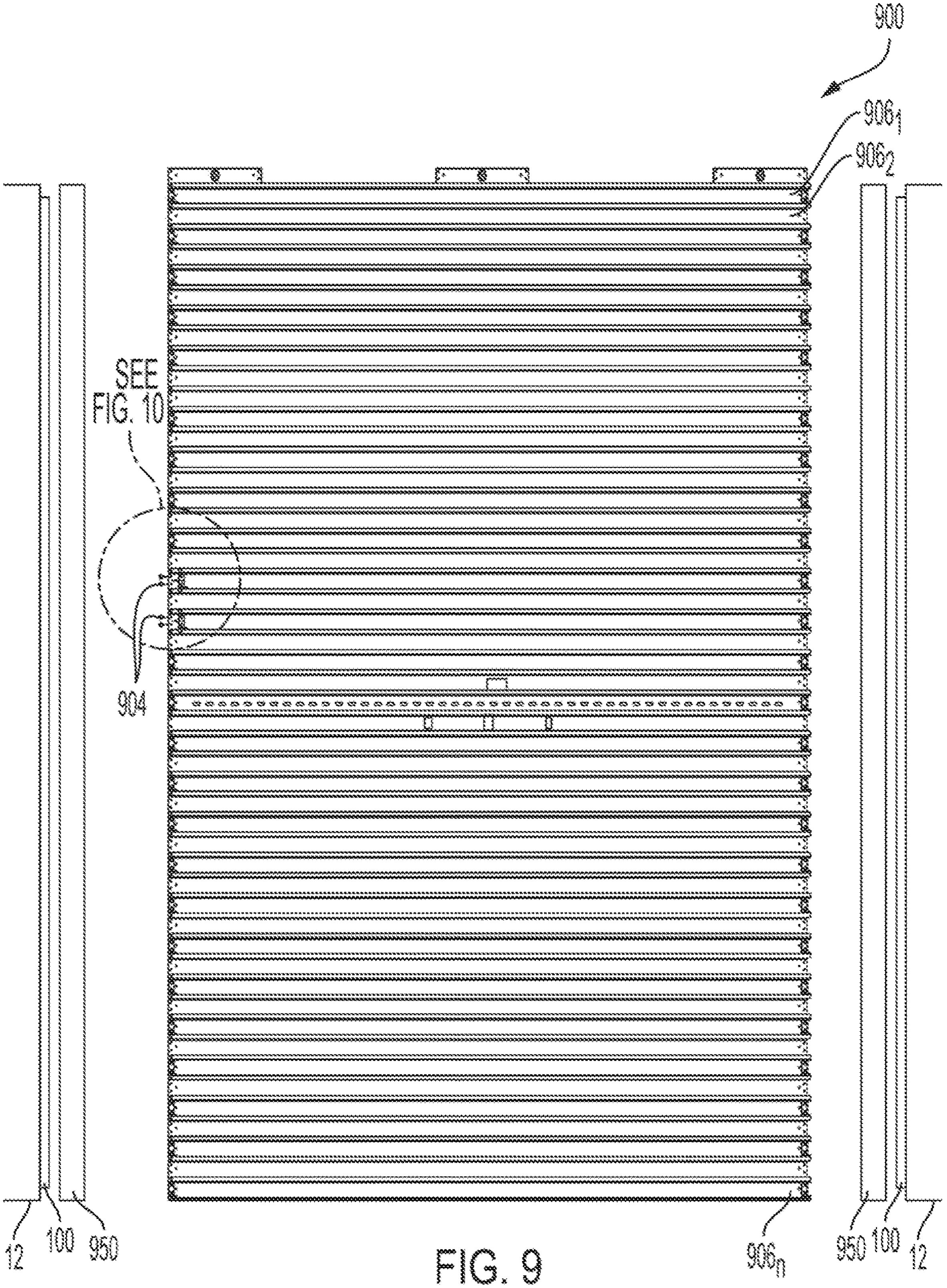
FIG. 9 illustrates an example overhead door with slats connected by endlocks of the present disclosure.

Such panels are each mounted within a track system or overhead door track on the left and right sides of the opening in the doorway structure. FIG. 9 illustrates a rolling overhead door 900 with a curtain comprising slats. The rolling overhead door 900 may be a rolling or coiling door fabricated from metal. The rolling overhead door 900 may include a track system 950. The track system 950 may include guides or vertical tracks that can receive ends of the curtain's slats and guide movement of the rolling overhead door 900.

In one embodiment, the track system 950 may be coupled to a doorway structure 12. The rolling overhead door 900 may also include a vibration isolator 100 that is coupled between the track system 950 and the doorway structure 12. The vibration isolator 100 or dampener may help reduce, absorb, or dampen vibrations in the rolling overhead door 900 as the overhead door is opened and closed, as described above. The vibration isolator 100 may also prevent the track system 950 from shifting or moving over time.

In addition, the vibration isolator 100 may help maintain an R-value or U-factor for the rolling overhead door 900. R-value may be a measure of how well a two-dimensional barrier (e.g., the rolling overhead door 900) resists conductive flow of heat. The R-value may be defined as a temperature difference per unit of heat flux needed to sustain one unit of heat flux between the warmer surface (e.g., the interior side of the rolling overhead door 900) and the colder surface (e.g., the exterior side of the rolling overhead door 900 exposed to the outdoor environment) of a barrier under steady-state conditions.

The U-factor may be defined as an amount of thermal energy transmitted through a door. A lower U-factor represents a better insulated door. U-factor may be measured in units of British thermal units per hour, square feet, and degrees Fahrenheit (BTU/hr-ft$^2$-° F.). U-factor testing may involve a full size door and can be tested with or without windows. The U-factor may often be less than 1.0 and be expressed as values of 0.32, 0.25 or 0.16 where 0.16 is the best door for insulting properties. Further details of the vibration isolator 100 are illustrated in FIGS. 3-6 and discussed below.

In addition, the rolling overhead door 900 may include additional components that are not shown. For example, the overhead door's curtain may be coupled to a shaft that is coupled to a motor. The motor may rotate the shaft to coil and/or uncoil the rolling overhead door 900 around the shaft. The rolling overhead door 900 may also include guides or vertical tracks that help keep the rolling overhead door 900 aligned within a building opening and provide efficient movement when the curtain coils and/or uncoils around the shaft. Other components may include a hood to cover the shaft, a bottom bar, a weather-seal, a locking mechanism, chain-hoist, and the like.

In one embodiment, the overhead door's curtain may be comprised of a plurality of slats 906$_1$ to 906$_n$ (hereinafter also referred to individually as a slat 906 or collectively as slats 906). The slats 906 may be fabricated from metal (e.g., aluminum, steel, alloys, and the like). Each slat 906 has an elongated structure with a width and a profile with a first rounded end at the top of the slat 906, a second rounded end at the bottom of the slat 906, a left end of the slat 906, and a right end of the slat 906. The first rounded end and the second rounded end are oriented parallel to each other, and the left end and the right end are oriented parallel to each other and perpendicular to the first rounded end and the second rounded end. The profile of the slat 906 is such that there is a front face of the slat and a back face of the slat 906. The profile further includes the first rounded end in a hook shape or "C" shape and the second rounded end in a hook shape or "C" shape that is able to slidably engage the first rounded end. A detailed view of the slat 906 with the rounded ends is illustrated in FIG. 10 and discussed below.

It is intended that known profile designs and engagement designs for a single wall slat or a double walled slat (for insulated slats) are contemplated to be used with the endlocks and described herein.

In one embodiment, the slats 906 may be coupled together via a mechanical coupling and held in the guides by the endlocks 904. The endlocks 904 may be coupled on each end of alternating slats 906. Said another way, the endlocks 904 may be coupled on each end of every other slat 906.

Figure 10:
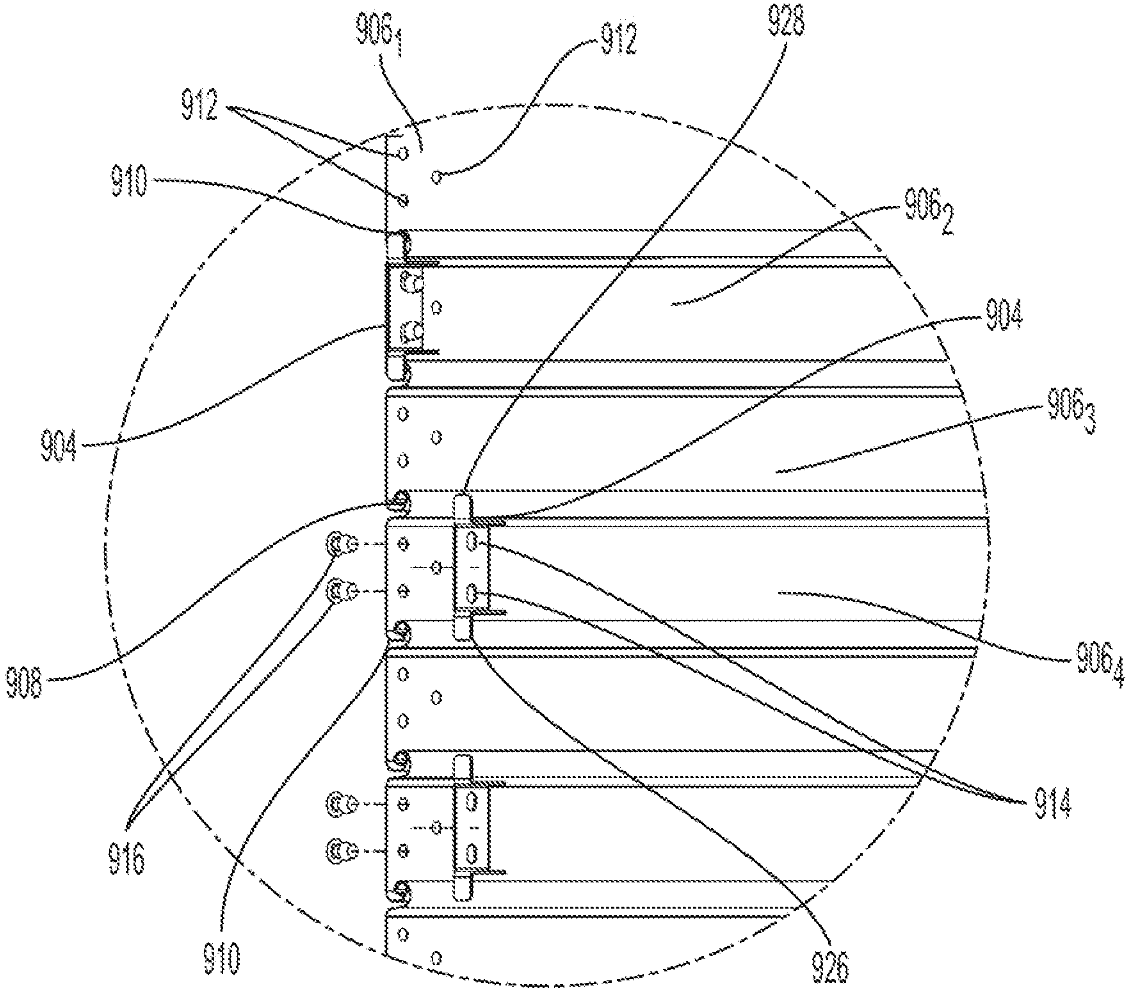
FIG. 10 illustrates a close-up view of the slats connected with the endlocks of the present disclosure.

FIG. 10 illustrates a more detailed exploded view of how the endlocks 904 are coupled to the slats 906. For example, each slat 906 may include a first rounded end 908 and a second rounded end 910. The second rounded end 910 may have a diameter that is smaller than the first rounded end 908. However, it should be noted that the second rounded end 910 may be designed to have a diameter that is larger than the first rounded end 908.

In one embodiment, the first rounded end 908 and the second rounded end 910 may have a spiral form. As a result, the second rounded end 910 of a first slat 906$_1$ may be slid into the first rounded end 908 of an adjacent slat 906$_2$. Similarly, the second rounded end 910 of the slat 906$_2$ may be slid into the first rounded end 908 of an adjacent slat 906$_3$, and so forth. The spiral form and concentric fit of the first rounded end 908 of a first slat 906$_1$ and second rounded end 910 of an adjacent slat 906$_2$ may help keep the slats 906 interlocked.

In one embodiment, the endlocks 904 may be coupled to the ends of a slat 906 via a fastener 916. The fastener 916 may be any type of mechanical fastener. For example, the fastener 916 may be a screw, a bolt, a nut and bolt combination, a rivet, and the like.

In one embodiment, the endlocks 904 may have holes 914. The holes 914 of the endlocks 904 may be aligned with openings 912 of the slat 906. The fastener 916 may be fed through the openings 912 and the holes 914 that are aligned to couple the universal endlock 904 to the end of a slat 906. A double walled slat with a front wall and a back wall may have holes in each wall or in a single wall of the slat for the attachment of the endlocks 904.

FIG. 10 illustrates an example endlock 904, but it should be noted that any type or design of endlock may be deployed. In an example, the endlock 904 may include a first lip 926 and a second lip 928. The first lip 926 may secure the interlocking of the second rounded end 910 of a first slat 906$_1$ to the first rounded end 908 of the slat 906$_2$. The second lip 928 may secure the second rounded end 910 of the slat 906$_2$ to the first rounded end 908 of the slat 906$_3$. Thus, the first lip 926 and the second lip 928 may be coupled to each end of the slat 906$_2$ to prevent the slat 906$_2$ from moving laterally (e.g., side-to-side or left and right along the page) to become disconnected from the adjacent slats 906$_1$ and 906$_3$.

In one embodiment, the endlock 904 may be coupled to each end of every other slat 906 as noted above. For example, if the first endlock 904 is coupled to the slat 906$_2$, then the second endlock 904 may be coupled to each end of the slat 906$_4$, the third endlock 904 may be coupled to each end of the slat 906$_6$, and so forth.

The endlocks 904 may be fit within a vertical track or guide. The endlocks 904 may secure the overhead door's curtain to the track system and guide movement of the rolling overhead door 900 as the rolling overhead door 900 is coiled and uncoiled around a shaft.

Figure 1:
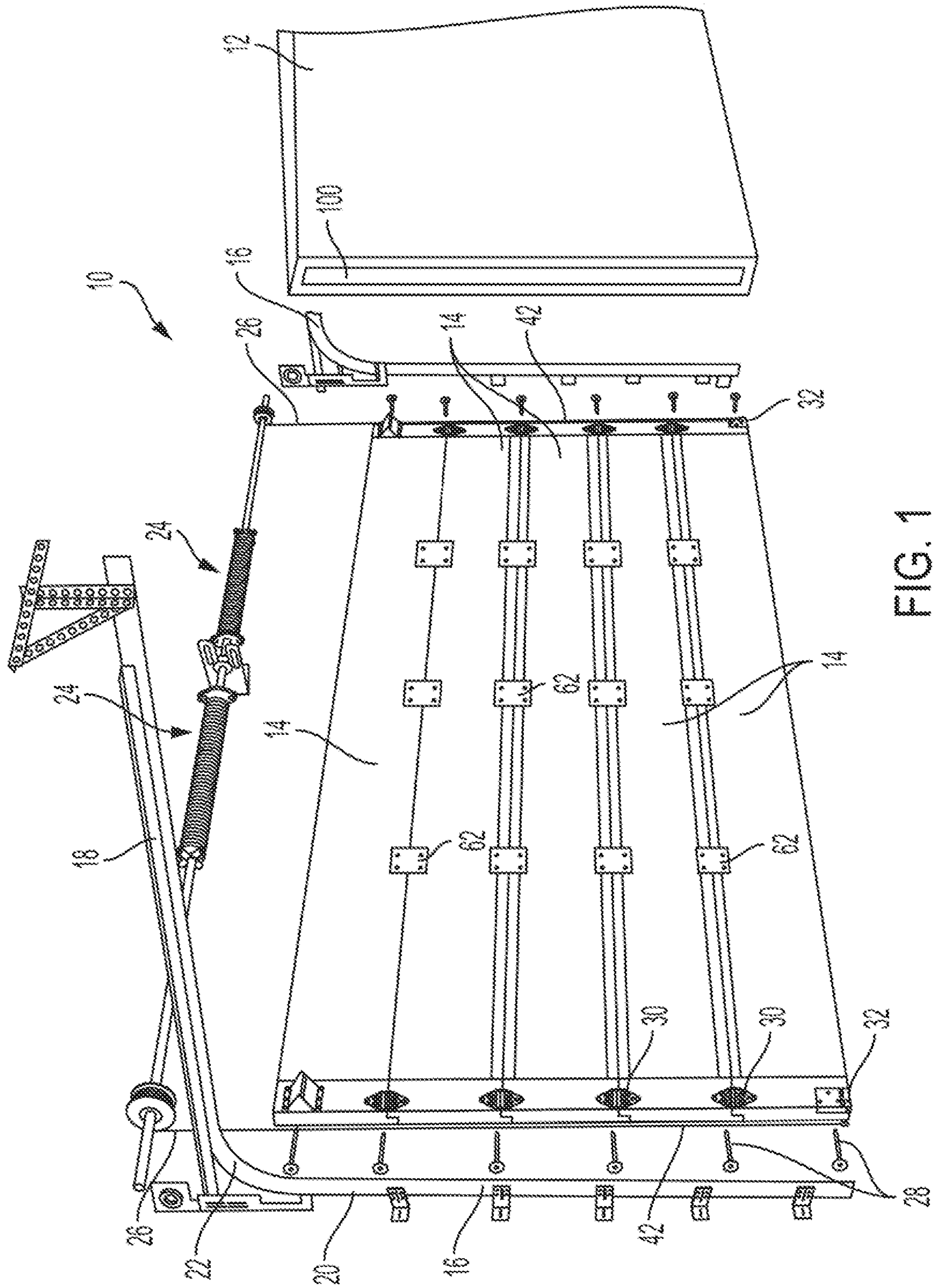
FIG. 1 illustrates an example overhead door with connected panels of the present disclosure viewed from the inside of a building.

FIG. 1 illustrates an example overhead door 10 with connected panels 14 that include a vibration isolator or dampener 100 of the present disclosure. The example overhead door 10 may be a rolling door that is utilized in a residential, commercial, institutional, or other structure to selectively cover an opening in a wall of the structure.

As shown in FIG. 1, the overhead door 10 includes a number of elongate and generally horizontally oriented door panels 14 (also referred to herein as panels 14). The overhead door 10 and the panels 14 are movable selectively to and between a closed position in which the door covers an opening in a doorway structure 12 and an open position which exposes the opening in the doorway structure 12 and positions the panels 14 in a head area superjacent to the opening in the doorway structure 12.

As can be further seen in FIG. 1, the panels 14 are each mounted within a track system or overhead door track 16 on the left and right sides of the opening in the doorway structure 12. It should be noted that FIG. 1 illustrates one side of the doorway structure 12. The opposite side of the doorway structure 12 is not shown. In addition, FIG. 1 illustrates an exploded view of the overhead door 10, the track system 16, and the doorway structure 12 to show the vibration isolator 100 and other various components.

In one embodiment, the track system 16 may include a horizontal track section 18, a vertical track section 20, and a transition track section 22 mounted on each side of the opening in the doorway structure 12. The track system 16 may be located at lateral ends 42 of the panels 14.

In one embodiment, the panels 14 may be interconnected with hinges 62. The hinges 62 may keep adjacent panels 14 connected as the panels 14 move to an open position. The hinges 62 bend or rotate as the panels 14 move through the transition track section 22 of the track system 16.

Each panel 14 may include a roller hinge 30 that is connected at the lateral ends 42 of the panel 14. The roller hinge 30 may include a roller 28 for coupling the overhead door 10 to the track system 16. The track system 16 may have a generally J-shaped cross-sectional configuration into which each roller 28 is captured to assist in the movement and articulation of the overhead door 10 to and between the closed and open positions as the rollers 28 translate along the vertical track section 20, the transition track section 22, and the horizontal track section 18 of the track system 16.

Although, the track system 16 is illustrated to accommodate the rollers 28 of the overhead door 10, it should be the noted that the track system 16 may be configured to accommodate other types of mechanical structures and doors. For example, the vertical tracks 20 may be used to capture ends of a roll-up door with endlocks (e.g., as illustrated in FIGS. 9 and 10 and discussed in further detail above) and assist in the movement and articulation of roll-up doors.

The panels 14 are raised and lowered to open and close the opening for traffic to pass through, as required. The weight of the panels 14 is counterbalanced by a set of extension springs or a counterbalance system 24, which is in turn indirectly fastened to a cable 26, which is directly fastened to either the upper panel or a bottom bracket 32 on a lower panel. The overhead door 10 may be between 6 feet to 15 feet in width and 3 feet to 12 feet in height.

In one embodiment, as a torsion rod of the counterbalance system 24 rotates as the overhead door 10 opens or closes, a drum at each end of the torsion rod also rotates. The cable 26, having a first end secured to one of the drums and a second end secured to one of the bottom brackets 32, may be wound on the drum when the overhead door 10 opens, helping to lift the overhead door 10, and may unwind from the drum when overhead door 10 closes, controlling the descent of the overhead door 10.

In one embodiment, the counterbalance system 24 may include extension springs located to the mounting brackets of the track system 16 with a cable 26 that is attached to the bottom bracket 32. One end of an extension spring may be secured to a ceiling-mounted bracket. A second end of the extension spring may be secured to a first pulley. The cable 26 may extend around the first pulley, over a stationary pulley, and to the bottom bracket 32.

The vibration isolator or dampener 100 may help reduce, absorb, or dampen vibrations in the overhead door 10 as the overhead door is opened and closed, as described above. The vibration isolator 100 may also prevent the vertical track portion 20 from shifting or moving over time. In addition, the vibration isolator 100 may help maintain an R-value for the overhead door 10, as described above or the overhead door 900.

Figure 2:
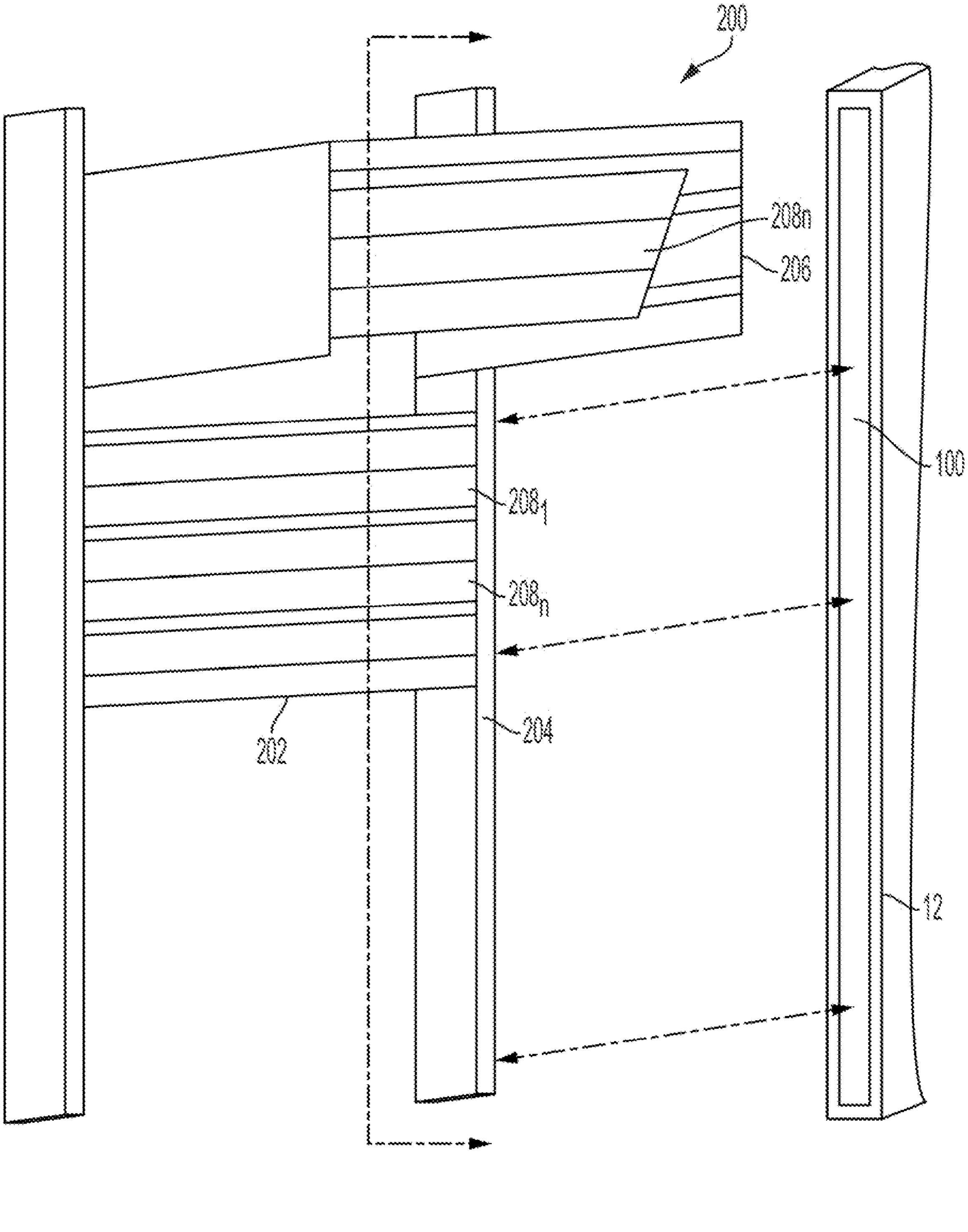
FIG. 2 illustrates an exploded view of an example overhead door with separated panels and a vibration isolator on a doorway structure of the present disclosure viewed from the inside of a building.

FIG. 2 illustrates an example overhead door system 200 with separated panels $\mathbf{208}_1$ to $\mathbf{208}_n$ that includes the vibration isolator 100 of the present disclosure. The overhead door system 200 may include a door 202 that is comprised of a plurality of panels $\mathbf{208}_1$ to $\mathbf{208}_n$ (hereinafter also referred to individually as a panel 208 or collectively as panels 208). The door 202 may be opened by moving the panels 208 vertically along a vertical track portion 204. As the panels 208 are separated, the panels 208 can be stacked along a horizontal track portion 206.

In one embodiment, the panels 208 may include end caps that include wheels or rollers (e.g., similar to the rollers 28 illustrated in FIG. 1) that can move within vertical track portion 204 and the horizontal track portion 206. The horizontal track portion 206 may be positioned at a slight angle to allow for gravity assist when the door 202 is closing.

In one embodiment, the door 202 may be closed by moving the panels 208 towards the vertical track portion 204 one-by-one. The panels 208 may be stacked on top of one another as the door 202 is closed.

In one embodiment, the vertical track portion 204 may be coupled to an opening of a doorway structure 12. For example, a first vertical track portion 204 may be coupled to a first side of the doorway structure 12 and a second vertical track portion 204 may be coupled to a second side of the doorway structure 12 opposite the first side. In one embodiment, the vibration isolator 100 may be located between the vertical track portion 204 and a surface of the doorway structure 12 on both sides of the doorway structure.

Figure 3:
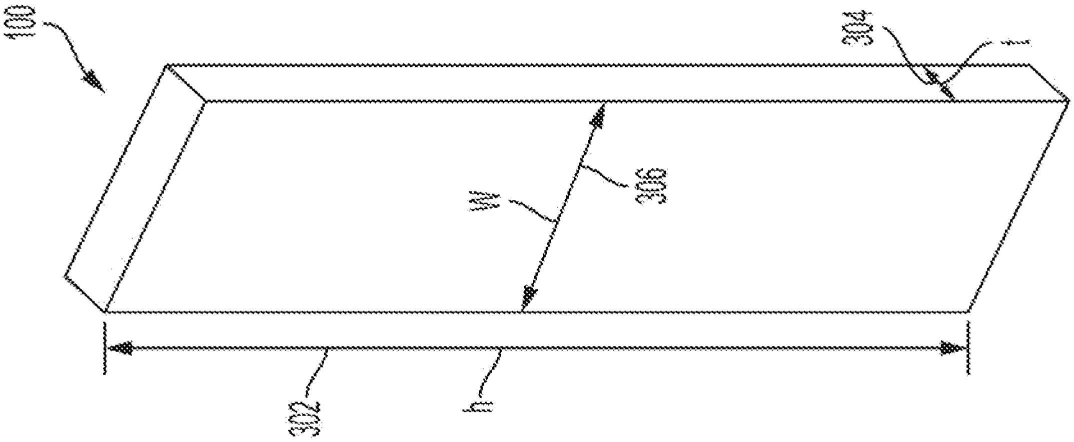
FIG. 3 illustrates an isometric view of an example of a vibration isolator of the present disclosure.

FIG. 3 illustrates an isometric view of an example of the vibration isolator 100 of the present disclosure. The vibration isolator 100 may have a height (h) measured along a line 302, a thickness (t) measured along a line 304, and a width (w) measured along a line 306. The height 302 and the width 306 of the vibration isolator 100 may be equal to or larger than a height and a width of the track 16 or 204.

In one embodiment, the vibration isolator 100 may have a thickness 304 that prevents movement of the track 16 or the track 204 over time as the overhead door is opened and closed. As noted above, having a thickness 304 that is too large may cause functional issues with the overhead door over time.

In one embodiment, the vibration isolator 100 may have a thickness between 3⁄16 inches to 3⁄8 inches. In one embodiment, the vibration isolator 100 may have a thickness of approximately 3⁄8 inches.

In one embodiment, the vibration isolator 100 may be fabricated as a single solid polymer based material. For example, the polymer based material may be a nitrile based polymer. In one embodiment, the vibration isolator 100 may be fabricated as a single solid nitrile rubber based material. In one embodiment, the nitrile based polymer or the nitrile rubber may be nitrile butadiene. In another example, the single solid polymer based material may include neoprene rubber.

In one embodiment, the vibration isolator 100 may have a shore hardness (A) of between 20 A to 60 A. Shore hardness may be a measure of a material's resistance to indentation. Shore hardness may provide a scale of hardness for different materials, including rubber and plastics. In one embodiment, the shore hardness of the vibration isolator 100 may be 20 A, 40 A, 50 A, or 60 A.

Figure 4:
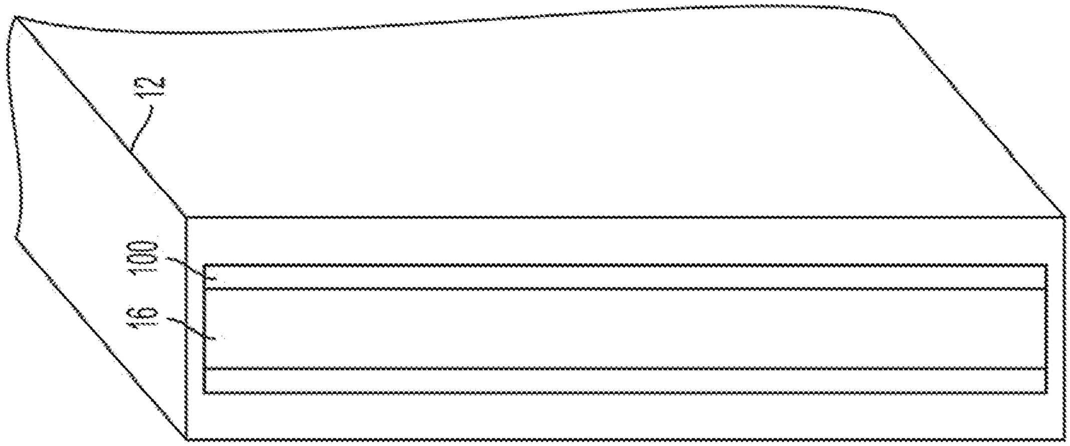
FIG. 4 illustrates a front view of an example of a vibration isolator of the present disclosure coupled between a doorway structure and a track of the overhead door.

FIG. 4 illustrates a simplified diagram of an example of the vibration isolator 100 located between a track 16 and a doorway structure 12. The track 16 may be similar to the track 16 illustrated in FIG. 1 or the track 204 illustrated in FIG. 2. FIG. 4 illustrates how the track 16 is coupled to vibration isolator 100 and against the doorway structure 12.

Also, as noted above, the vibration isolator 100 may have a height 302 and a width 306 that is equal to or greater than the height and the width of the track 16.

Figure 5:
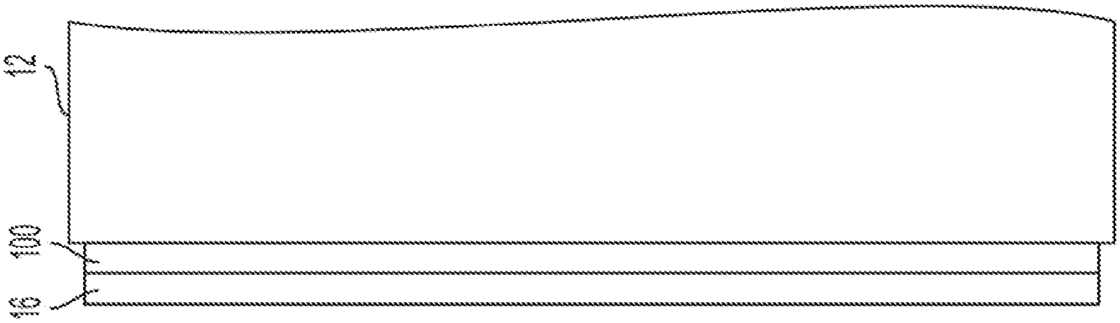
FIG. 5 illustrates a side view an example exploded view of the vibration isolator coupled between the doorway structure and the track of the overhead door.

FIG. 5 illustrates a simplified diagram of a side view of the vibration isolator 100 located between the track 16 and the doorway structure 12. As will be discussed in further details below and shown in FIGS. 7 and 8, the thickness 304 of the vibration isolator 100 may be compressed when installed between the track 16 and the doorway structure 12.

Figure 6:
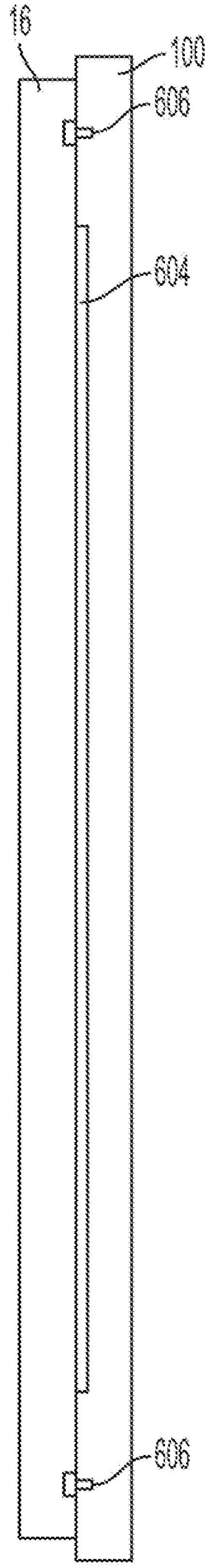
FIG. 6 illustrates a side view of an example of a vibration isolator of the present disclosure pre-attached to a track of the overhead door.

FIG. 6 illustrates a side view of a track 16 and the vibration isolator 100. The track 16 may be similar to the track 16 illustrated in FIG. 1 or the track 204 illustrated in FIG. 2.

FIG. 6 illustrates an example where the vibration isolator 100 may be pre-coupled to the track 16. As a result, the track 16 and the vibration isolator 100 do not have to be installed separately. Rather, a technician may simply install the track 16 with the vibration isolator 100 pre-attached to a doorway structure in a single step.

In one embodiment, the vibration isolator 100 may be coupled to the track 16 via a mechanical coupling 606, an adhesive 604, or a combination of both. In one example, the adhesive 604 may be a glue or a double sided tape. The adhesive 604 may be applied along a height of the vibration isolator 100 and the track 16. In one embodiment, the mechanical coupling 606 may be a screw, a nut and bolt, or any other type of fastener.

Figure 8:
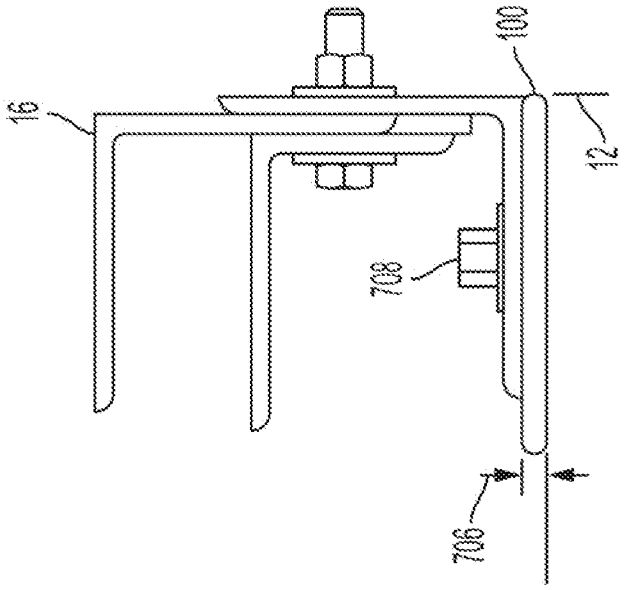
FIG. 8 illustrates a close up view of the track being assembled to the vibration isolator.
Figure 7:
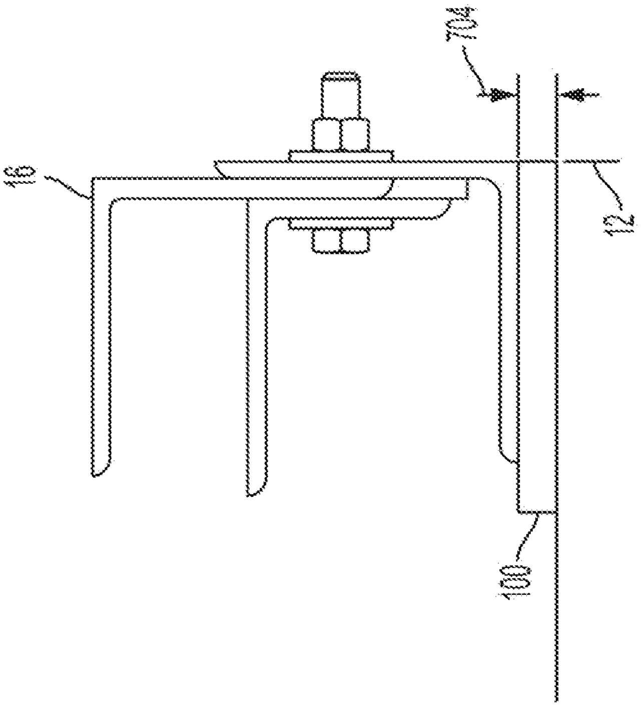
FIG. 7 illustrates a close up view of the track before being assembled to the vibration isolator.

FIGS. 7 and 8 illustrate a close up view of a portion of a track 702 16 that is coupled to the vibration isolator 100. The track 16 may be similar to the track 16 illustrated in FIG. 1 or the track 204 illustrated in FIG. 2.

FIG. 7 illustrates the vibration isolator 100 with an initial thickness 704 before the track 16 is coupled against the vibration isolator 100. The vibration isolator 100 may be placed against a doorway structure 12.

FIG. 8 illustrates the vibration isolator 100 with a compressed thickness 706 after the track 16 is coupled against the vibration isolator 100 and the doorway structure 12. The track 16 may be coupled to the vibration isolator 100 and the doorway structure 12 with a mechanical fastener 708 (e.g., a bolt, a screw, and the like).

As can be seen in FIG. 8, the vibration isolator 100 may be compressed when installed against the track 16 and the doorway structure 12. The compressed thickness 706 may be less than the initial thickness 704. The compression of the vibration isolator 100 may help to reduce vibrations in the door and track 16 when the door is opened and closed. The compression may also help maintain and R-value of the entire overhead door assembly/system, as noted above.

Thus, the present disclosure provides a vibration isolator that is made of a particular type of material with specific characteristics and dimensions to work with an overhead door. The vibration isolator may be designed to reduce vibrations caused by operation of the overhead door, provide long term stability and prevent shifting of the guides after multiple cycles of opening and closing the overhead door, and maintain R-values for the overhead door.

It will be appreciated that variants of the above-disclosed and other features and functions, or alternatives thereof, may be combined into many other different systems or applications. Various presently unforeseen or unanticipated alternatives, modifications, variations, or improvements therein may be subsequently made by those skilled in the art which are also intended to be encompassed by the following claims.

The invention claimed is:

1. An overhead door track, comprising:
- a vertical track section having an opening to receive ends of a slat or a panel of an overhead door and to guide movement of the overhead door within the opening; and
- a single solid polymer based vibration isolator coupled directly on a first surface of a first wall of a doorway structure that defines an opening and between the vertical track section and the first surface of the first wall of the doorway structure, wherein the single solid polymer based vibration isolator is coupled only to the vertical track section via an adhesive, wherein the vertical track section is coupled to the first surface via a mechanical fastener, wherein the first surface of the first wall of the doorway structure faces a second surface of a second wall of the doorway structure that is opposite the first surface, wherein the overhead door covers the opening defined by the doorway structure, wherein the single solid polymer based vibration isolator is to reduce vibration of the vertical track section caused by movement of the overhead door within the opening defined by the doorway structure, wherein the single solid polymer based vibration isolator has a thickness between 3/16 inches to 3/8 inches, wherein the single solid polymer based vibration isolator has a width and a height that are equal to or greater than a width and a height, respectively, of the vertical track section, wherein the height of the single solid polymer based vibration isolator and the height of the vertical track section are measured from a respective bottom side closest to a floor to a respective top side closest to a ceiling.

2. The overhead door track of claim 1, wherein the single solid polymer based vibration isolator comprises a nitrile based polymer.

3. The overhead door track of claim 2, wherein the nitrile based polymer comprises nitrile butadiene.

4. The overhead door track of claim 1, wherein the single solid polymer based vibration isolator has a shore hardness (A) of between 20 A to 60 A.

5. An overhead door track, comprising:
- a vertical track section having an opening to receive an end of a slat or a panel of an overhead door and to guide movement of the end within the opening; and
- a single solid nitrile rubber based vibration isolator coupled directly on a first surface of a first wall of a doorway structure that defines an opening and between the vertical track section and the first surface of the first wall of the doorway structure, wherein the single solid nitrile rubber based vibration isolator is coupled only to the vertical track section via an adhesive, wherein the vertical track section is coupled to the first surface via a mechanical fastener, wherein the first surface of the first wall of the doorway structure faces a second surface of a second wall of the doorway structure that is opposite the first surface, wherein the overhead door covers the opening defined by the doorway structure, wherein the single solid nitrile rubber based vibration isolator is to reduce vibration of the vertical track section caused by movement of the end within the opening of the vertical track section, wherein the single solid nitrile rubber based vibration isolator has a thickness between 3/16 inches to 3/8 inches, wherein the single solid nitrile rubber based vibration isolator has a width and a height that are equal to or greater than a width and a height, respectively, of the vertical track section, wherein the height of the single solid nitrile rubber based vibration isolator and the height of the vertical track section are measured from a respective bottom side closest to a floor to a respective top side closest to a ceiling.

6. The overhead door track of claim 5, wherein the single solid nitrile rubber based vibration isolator comprises nitrile butadiene.

7. The overhead door track of claim 5, wherein the single solid nitrile rubber based vibration isolator has a shore hardness (A) of between 20 A to 60 A.

8. An overhead door, comprising:

a track system, wherein the track system comprises a first vertical track section and a second vertical track section that are coupled to opposite sides of a doorway structure;

a plurality of slats, wherein each slat of the plurality of slats is connected via a plurality of endlocks on opposite sides of the each slat, wherein the track system is to receive the endlocks and to guide movement of the plurality of slats; and a plurality of solid nitrile rubber based vibration dampeners, wherein a first solid nitrile rubber based vibration dampener of the plurality of solid nitrile rubber based vibration dampeners is located directly on a first surface of a first wall of the doorway structure that defines an opening and between the first vertical track section and the first surface of the first wall of the doorway structure, wherein a second solid nitrile rubber based vibration dampener of the plurality of solid nitrile rubber based vibration dampeners is located directly on a second surface of a second wall of the doorway structure and between the second vertical track section and the second surface of the second wall of the doorway structure, wherein, via an adhesive, the first solid nitrile rubber based vibration dampener is coupled only to the first vertical track section and the second solid nitrile rubber based vibration dampener is coupled only to the second vertical track section, wherein the first vertical track section is coupled to the first surface via a first mechanical fastener, the second vertical track section is coupled to the second surface via a second mechanical fastener, wherein the first surface is opposite the second surface, wherein the first surface faces the second surface wherein the overhead door covers the opening defined by the doorway structure, wherein each one of the plurality of solid nitrile rubber based vibration dampeners has a thickness between 3/16 inches to 3/8 inches, wherein the first solid nitrile rubber based vibration dampener and the second solid nitrile rubber based vibration dampener each has a width and a height that are equal to or greater than a width and a height, respectively, of the first vertical track section or the second vertical track section, wherein the height of the first solid nitrile rubber based vibration dampener, the height of the second solid nitrile rubber based vibration dampener, the height of the first vertical track section, and the height of the second vertical track section are measured from a respective bottom side closest to a floor to a respective top side closest to a ceiling.

9. The overhead door of claim 8, wherein each one of the plurality of solid nitrile rubber based vibration dampeners comprises nitrile butadiene.

10. The overhead door of claim 8, wherein each one of the plurality of solid nitrile rubber based vibration dampeners has a shore hardness (A) of between 20 A to 60 A.

11. The overhead door of claim 8, wherein the plurality of slats are interconnected to form a rolling steel door.

* * * * *